US012623602B2

(12) United States Patent
M et al.

(10) Patent No.: US 12,623,602 B2
(45) Date of Patent: May 12, 2026

(54) INSTEP ENCLOSURE ARRANGEMENT FOR A CABIN OF A VEHICLE

(71) Applicant: Volvo Truck Corporation, Gothenburg (SE)

(72) Inventors: Arvind M, Tamil Nadu (IN); Gangubai Hegde, Thindlu (IN); Madhuchandra K S, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 377 days.

(21) Appl. No.: 18/267,548

(22) PCT Filed: Dec. 20, 2021

(86) PCT No.: PCT/EP2021/086865

§ 371 (c)(1),
(2) Date: Jun. 15, 2023

(87) PCT Pub. No.: WO2022/136305

PCT Pub. Date: Jun. 30, 2022

(65) Prior Publication Data

US 2024/0060345 A1     Feb. 22, 2024

(30) Foreign Application Priority Data

Dec. 23, 2020     (IN) .............................. 202041056143

(51) Int. Cl.
B60R 3/00          (2006.01)
(52) U.S. Cl.
CPC ...................................... B60R 3/00 (2013.01)

(58) Field of Classification Search
CPC ....................................................... B60R 3/00
See application file for complete search history.

(56)          References Cited

U.S. PATENT DOCUMENTS

2018/0266171 A1     9/2018  Jochum et al.

FOREIGN PATENT DOCUMENTS

| | | | | | |
|---|---|---|---|---|---|
| CN | 210013604 U | * | 2/2020 | | |
| DE | 102011010198 A1 | * | 9/2011 | ............... | B60R 3/00 |
| DE | 102012019187 A1 | * | 3/2013 | ........... | B62D 35/001 |
| DE | 102018001924 A1 | | 8/2018 | | |
| EP | 2017128 A1 | * | 1/2009 | ............... | B60R 3/02 |
| WO | 2007123447 A1 | | 11/2007 | | |

(Continued)

OTHER PUBLICATIONS

Wang, Chinese Patent No. CN 210013604 U, English translation dated 2025. (Year: 2020).*

(Continued)

*Primary Examiner* — Caroline N Butcher
(74) *Attorney, Agent, or Firm* — Withrow & Terranova, PLLC

(57)          ABSTRACT

An instep enclosure arrangement for a cabin of a vehicle, comprising at least one instep portion, a retractable cover for enclosing access to the instep portion in a closed orientation, and a displaceable mechanical linkage assembly for operatively connecting the retractable cover with a door of the vehicle, whereby the retractable cover is configured to move from the closed orientation towards a retracted state in response to a movement of the door so as to permit access to the instep portion.

13 Claims, 3 Drawing Sheets

(56)        References Cited

FOREIGN PATENT DOCUMENTS

WO        WO-2017034495 A1 *  3/2017   .............. B60R 3/00

OTHER PUBLICATIONS

Bisinger, German Patent No. DE 102011010198 A1, English trans-
lation dated 2025. (Year: 2011).*
Miljanic et al., DE 102012019187 A1. English translation dated
2025. (Year: 2013).*
Plettrichs, European Patent No. EP 2017128 A, English translation
dated 2025. (Year: 2009).*
International Search Report and Written Opinion for International
Patent Application No. PCT/EP2021/086865, mailed Mar. 18, 2022,
12 pages.

* cited by examiner

INSTEP ENCLOSURE ARRANGEMENT FOR A CABIN OF A VEHICLE

This application is a 35 USC 371 national phase filing of International Application No. PCT/EP2021/086865, filed Dec. 20, 2021, which in turn claims priority to Indian Patent Application number 202041056143, filed Dec. 23, 2020, the disclosures of which are incorporated herein by reference in their entireties.

TECHNICAL FIELD

The disclosure relates to an instep enclosure arrangement for a cabin of a vehicle. The disclosure also relates to a truck cabin and a vehicle comprising such an instep enclosure arrangement. The disclosure is applicable on vehicles, in particular trucks, buses, working machines within the fields of industrial construction machines or construction equipment, such as articulated haulers. Although the disclosure will mainly be described in relation to heavy-duty vehicle, it may also be applicable on other types of vehicles and trucks, e.g. light-weight trucks, dump trucks, wheel loaders and the like.

BACKGROUND

In connection with transportation of heavy loads on roads or at construction sites or the like, a heavy-duty vehicle is often used. Such types of vehicles are generally designed with truck cabs of rather high floor height as seen from the ground level. As such, it is often necessary to arrange one or more steps, stairs or ladders so drivers and passengers can enter and exit the truck cab in a safe manner.

One existing solution in the field of instep arrangement for entering a truck cab may be to provide the steps as retractable footsteps. In this type of arrangement, the footsteps are configured to flip outward of the truck, thereby enabling the drivers and passengers to climb inside.

While such types of retractable footsteps may be useful for some types of vehicles, there is still a need for improving the instep arrangement of vehicles, in particular heavy-duty vehicles. By way of example, it would be desirable to improve the function of the instep arrangement in view of other demands on the exterior of the vehicle.

SUMMARY

It is an object of the present disclosure to provide an instep enclosure arrangement for a cabin of vehicle, such as a cabin of a truck, which arrangement comprises a retractable cover for covering the access to the instep portion during operation of the vehicle so as to contribute to an improved aerodynamic design of the exterior parts of the vehicle. The object is at least partly achieved by an arrangement to claim 1. The objective is also achieved by the other independent claims. The dependent claims are directed to advantageous embodiments of the disclosure.

According to a first aspect of the present invention, there is provided an instep enclosure arrangement for a cabin of a vehicle, comprising at least one instep portion, a retractable cover for enclosing access to the instep portion in a closed orientation, and a displaceable mechanical linkage assembly for operatively connecting the retractable cover with a door of the vehicle, whereby the retractable cover is configured to move from the closed orientation towards a retracted state in response to a movement of the door so as to permit access to the instep portion.

In other words, the configuration provides a retractable closure mechanism for the instep region in e.g. a cabin. In this manner, the instep enclosure arrangement provides for a simple, yet robust arrangement of allowing easy access to the step(s) when needed, while improving the aerodynamic shape of the instep portion during driving of the vehicle. The example embodiments of the instep enclosure arrangement are based on the insight that existing retractable steps are often rather complicated configurations, while the option of maintaining the instep region open when the vehicle is driven generally creates a considerable amount of aerodynamic drag to the vehicle during cruising as well as cornering. That is, maintaining the insteps region open while the truck is driven creates a considerable amount of aerodynamic drag to the vehicle. To this end, the above configuration of the instep enclosure arrangement contributes to a more optimum aerodynamic shape and size without affecting the overall functionality of the instep region.

Furthermore, the configuration of the instep enclosure arrangement may allow for using existing instep regions in a truck, while improving the aerodynamic performance by means of a mechanical solution. Also, the configuration of the instep enclosure arrangement may be completely operated with the mechanical linkage. Hence, the instep enclosure arrangement may be possible to implement in an existing vehicle without consuming power or requiring compressed air for actuation.

Rather, the instep enclosure arrangement is configured to co-operate with the door of the cabin. In this manner, the arrangement is configured to co-operate with the door and configured such that, when the retractable cover is in the closed orientation (generally corresponding to a non-retracted state), access of the instep portion is closed, while, when the retractable cover is in the retracted state, access of the instep portion is possible. In other words, the retractable cover is configured to co-operate with the door of the truck cabin such that the retractable cover is moved in the retracted state when the door is opened, while the retractable cover is moved in the non-retracted state when the door is closed, whereby access to the instep portion is closed. Typically, the retractable cover is fully moved into the retracted state when the door is fully opened.

To this end, the instep enclosure arrangement according to the above contributes to reduce the aerodynamic drag of the vehicle during driving, thereby reducing overall vehicle fuel consumption.

Typically, the retractable flap is configured to return to the closed orientation relative to the instep portion when the door is closed relative to the cabin. Hereby, the access to the instep portion is closed, i.e. covered by the retractable cover. Accordingly, when the door closes, the retractable cover is pushed, by forces from the mechanical linkage assembly, to its closed orientation.

According to one example embodiment, the retractable cover is a spring-biased retractable cover so as to permit the retractable cover to return back to its closed orientation when the door is closed. In this manner, there is provided a more autonomous arrangement that also contribute to a more user-friendly functionality of the arrangement.

Typically, the displaceable mechanical linkage assembly may be arranged to extend between the retractable cover and the door. In other words, the mechanical linkage assembly provides for mechanically connecting the retractable cover with the door.

In one configuration, the displaceable mechanical linkage assembly may comprise a movable door-cabin connecting part for connecting the door with the cabin. The movable door-cabin connecting part may be arranged to effect movement of the retractable cover upon a rotational movement of the door. By example, a rotational movement of the door from a closed position to an open position may generally effect a pulling action on the displaceable mechanical linkage assembly so as to move the flap from its closed orientation to its retracted state, while a rotational movement of the door from an open position to a closed position may generally effect a pushing action on the displaceable mechanical linkage assembly so as to move the flap from its retracted state to its closed orientation.

According to one example embodiment, the movable door-cabin connecting part is arranged to effect movement of the retractable cover upon a rotational movement of the door via a wire extending between the movable door-cabin connecting part and the retractable cover.

According to one example embodiment, the moveable door-cabin connecting part is a door rotational locking device configured to stop the door at a number of positions. By way of example, the door rotational locking device is a door check link mechanism.

In addition, or alternatively, the displaceable mechanical linkage assembly may comprise a wire being directly connected to an inner surface of the door.

According to one example embodiment, the retractable cover comprises a locking part, such as a magnet, for securely fixating the retractable cover relative to the instep portion when the retractable cover is in the closed orientation.

According to one example embodiment, the retractable cover is rotationally arranged to another part of the instep enclosure arrangement. By way of example, the retractable cover is rotationally arranged to an instep of the instep enclosure arrangement. According to one example embodiment, the retractable cover is configured to move between the retracted state and the closed orientation by a rotation about a pivot axis when pulled by the mechanical linkage assembly in response to the rotational movement of the door.

According to one example embodiment, the retractable cover is a foldable arrangement. Typically, the retractable cover is a retractable flap-type cover. The retractable flap-type cover may typically comprise at least one retractable flap. According to one example embodiment, the retractable flap comprises a number of foldable flap portions configured to be folded such that the retracted flap can be in a folded configuration in the retracted state in order to arrange the retractable flap inside an open space vertical above one instep of the instep portion. In this manner, it becomes possible to further improve the space for the driver's foot to be inserted when the instep portions is accessible by the driver. In other words, the instep enclosure arrangement comprises a flap-type enclosure in the form of a retractable flap so as to cover the opening, or hole, created at the instep portion, e.g. between two insteps of the instep portion of the truck exterior. The retractable flap may, by way of example, be provided in the form of a foldable flap system, such as a two-piece foldable flap system, that is retracted/folded by being pulled by the mechanical linkage assembly connected to the movement of the door of the cabin of truck.

Typically, the instep portion may generally be configured to provide support to a foot of the driver. The instep portion may include one or more insteps or footsteps, e.g. flat sheets of metal or the like, as is commonly used in the art.

In a second aspect, there is provided a cabin for a vehicle, comprising an instep enclosure arrangement according to the first aspect. The features and advantages described in relation to the first aspect of the disclosure are similarly applicable to the second aspect of the disclosure, and may also be combined with each other.

In a third aspect, there is provided a vehicle comprising a cabin according to the second aspect, and/or an instep enclosure arrangement according to the first aspect. The features and advantages described in relation to the first and second aspects of the disclosure are similarly applicable to the third aspect of the disclosure, and may also be combined with each other.

The vehicle may be a truck. However, the present disclosure may be implemented in a plurality of different types of vehicles. Purely by way of example, the present disclosure could be implemented in a truck, a tractor, a pick-up car, a bus, a working machine such as a wheel loader or an articulated hauler, or any other type of construction equipment.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
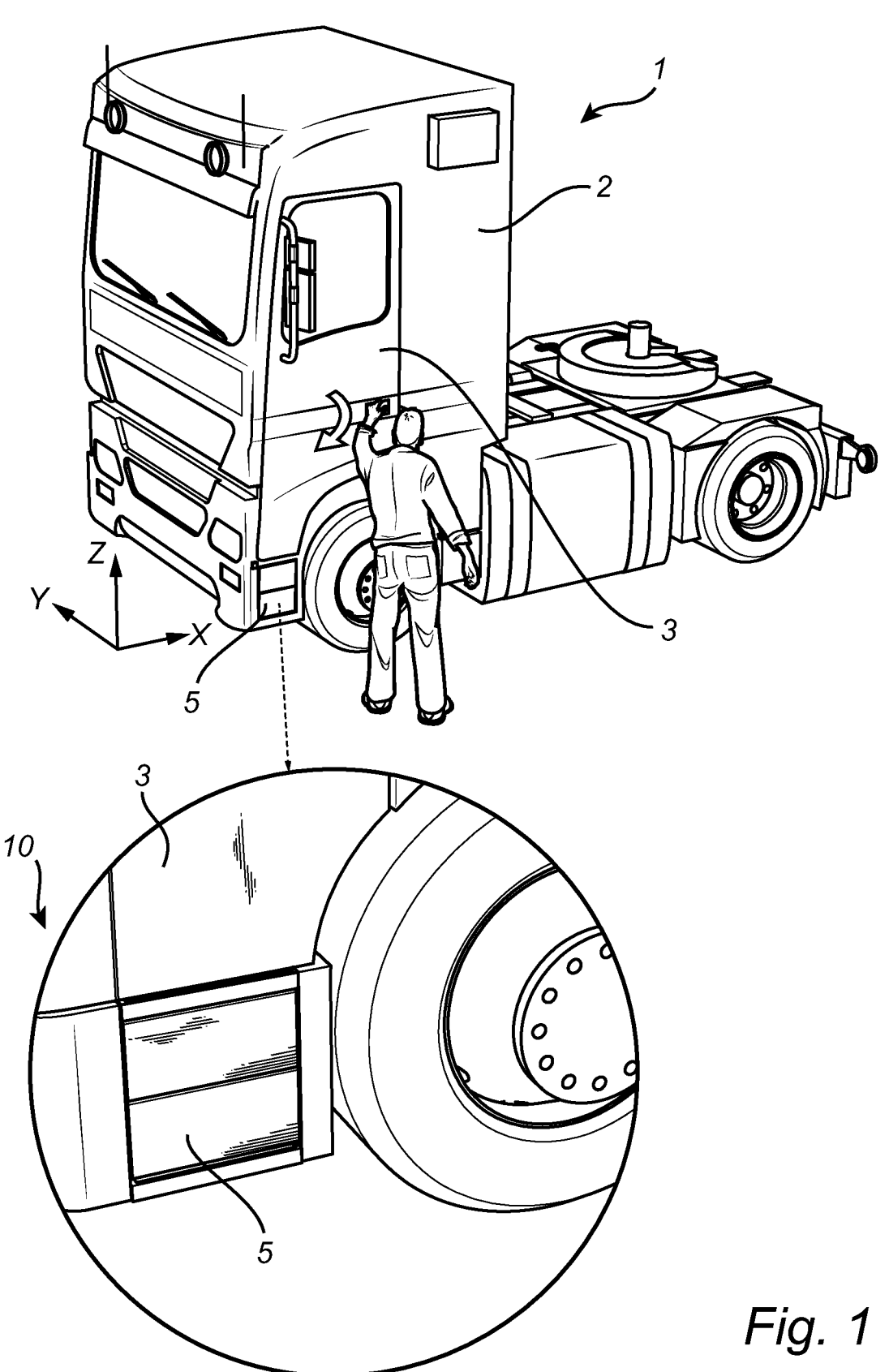
FIG. 1 is a perspective view illustrating an example of a vehicle in the form of a semi-truck with a cabin; the truck cabin comprising an instep enclosure arrangement according to one example embodiment of the present disclosure, in which a retractable cover of the instep enclosure arrangement is oriented in a closed orientation relative to an instep portion for entering the truck cabin.

With reference to the appended drawings, below follows a more detailed description of the embodiments of the disclosure cited as examples.

DETAILED DESCRIPTION

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 schematically illustrates a vehicle in the form of a truck 1. As illustrated in FIG. 1, the truck is here a semi-tractor. The truck 1 comprises a truck cabin 2 for a driver of the truck.

The truck 1 should be seen as an example of a vehicle which here comprises an instep enclosure arrangement 10 for the truck cabin 2. While the vehicle in FIG. 1 is illustrated in the form of a truck, the vehicle may likewise be another type of vehicle having a cabin for the driver, such as a working machine, e.g. an articulated hauler having a tractor unit with a cab for a driver and a trailer unit with a platform having a dump body.

Although not explicitly illustrated in FIG. 1 with reference numerals, the truck generally also comprises a chassis, a frame and a number of wheels. Furthermore, the truck here comprises a prime mover, such as an internal combustion engine. These parts of the vehicle are well-known and can be provided in several different ways depending on type of vehicle and type of driving condition. As these parts of the vehicle are well-known components, they will not be further described herein.

As illustrated in FIG. 1, the truck cabin 2 comprises a door 3 for allowing access for the driver to enter an inside of the cabin 2. The door 3 is here pivotable arranged on the cabin and possible to adjust between a closed position relative to the cabin and an open position, allowing the driver to enter into the cabin. Due to the location of the driver seat in the cabin 2, it is generally common to arrange one or more insteps below the door 3, as seen in a vertical direction Z of the vehicle 1. The insteps are thus arranged on a side of the cabin so as to facilitate for the driver to enter the driver seat. In FIG. 1, the insteps are covered by a retractable cover 5 in the form of a retractable flap-type cover. The retractable flap-type cover comprises at least one retractable flap. The retractable cover provided in the form of the retractable flap may herein simply be denoted as the flap for ease of describing the examples. As will be readily appreciated from the below, the flap 5 is provided so as to confer a smoother and more aerodynamic exterior surface of the cabin, thus contributing to enhance the aerodynamic properties of the truck cabin during operation of the truck.

Figure 2:
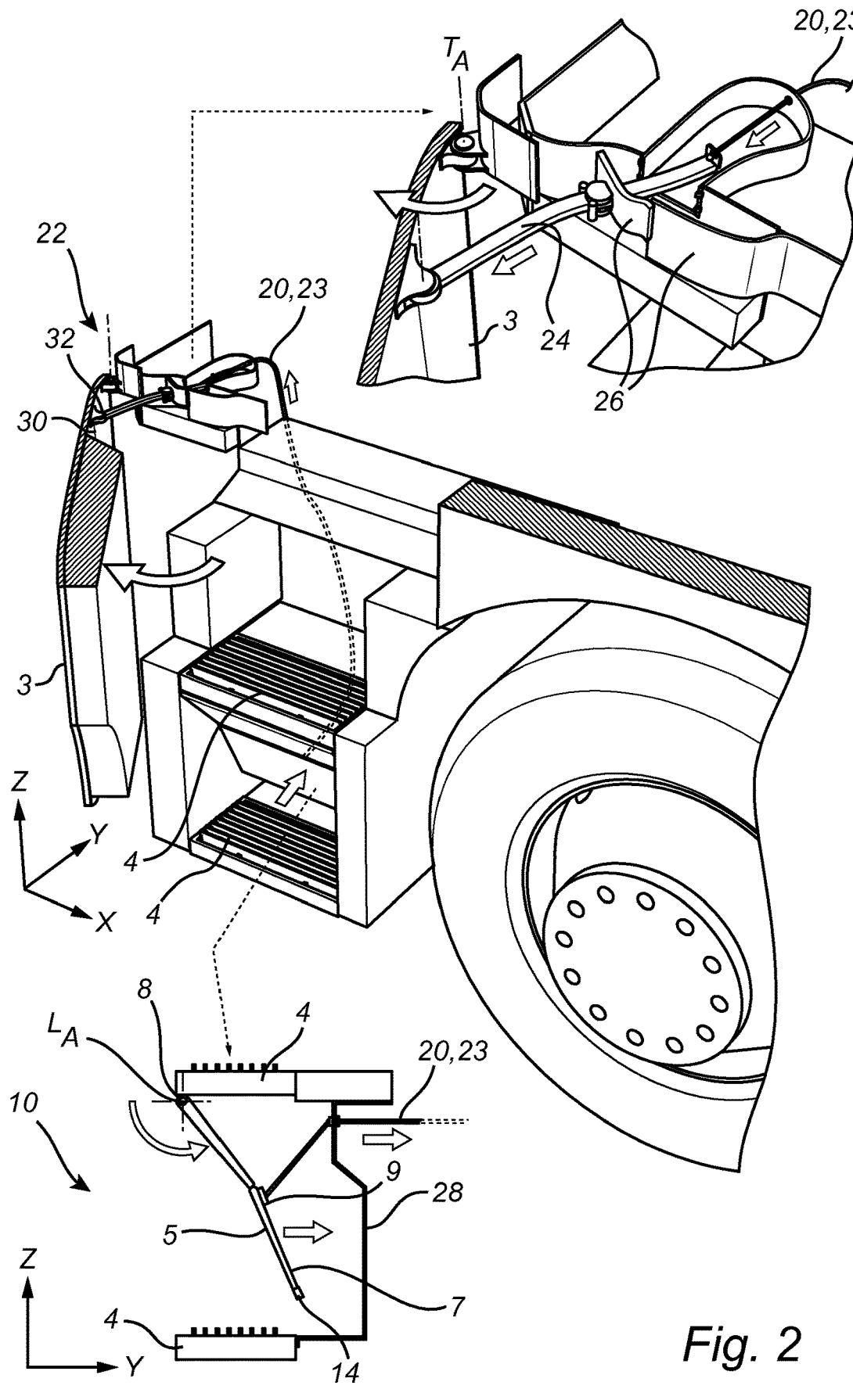
FIG. 2 schematically illustrates a perspective view of the instep enclosure arrangement in FIG. 1, in which the retractable cover of the instep enclosure arrangement is oriented in a partially retracted orientation relative to the instep portion.
Figure 3:
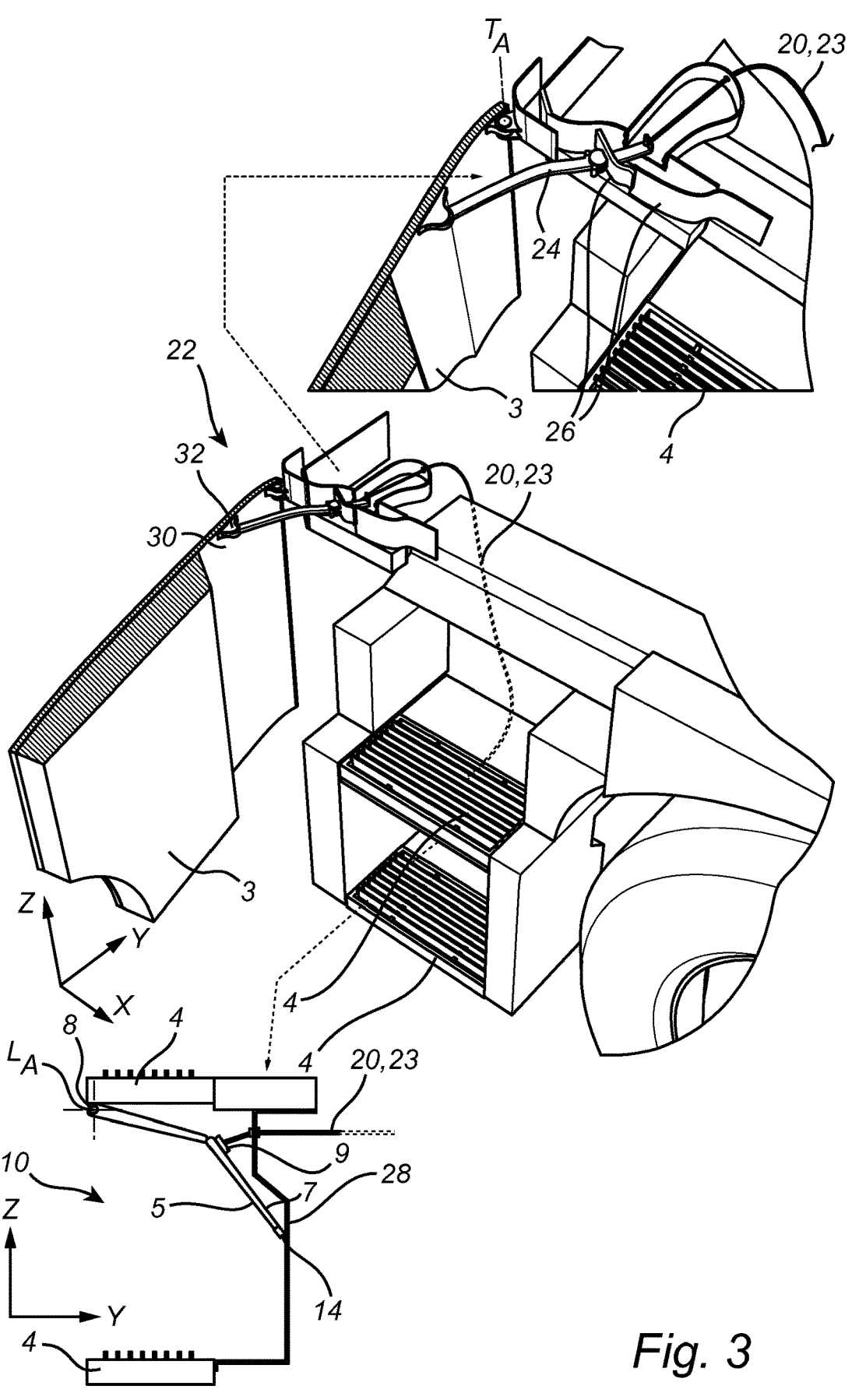
FIG. 3 schematically illustrates a perspective view of the instep enclosure arrangement in FIG. 1, in which the retractable cover of the instep enclosure arrangement is oriented in a fully retracted orientation relative to the instep portion.

Turning again to the instep enclosure arrangement 10, one example embodiment of the disclosure will now be described in more detail with reference to FIGS. 1 to 3, in which FIG. 1 shows the flap 5 in a closed orientation relative to an instep portion (illustrated in FIGS. 2 and 3) for entering the truck cabin 2, while FIGS. 2 and 3 show the retractable flap of the instep enclosure arrangement in a partially retracted orientation and a fully retracted orientation, respectively, relative to the instep portion.

The instep enclosure arrangement 10 provides for allowing access to the insteps when the door of the cabin is open, while restricting access to the insteps during operation of the truck when the door is closed.

As illustrated in the Figures, with particular reference to FIG. 2, the instep enclosure arrangement 10 typically extends in a longitudinal (length) direction X, a transverse (width) direction Y and in the vertical (height) direction Z. Further, as shown in the Figures, the directions form a conventional coordinate system, i.e. the three coordinate axis are given, each perpendicular to the other two at the origin, the point at which they cross. In other words, the longitudinal direction is perpendicular to the transverse direction. Analogously, the longitudinal direction is perpendicular to the vertical direction. Analogously, the vertical direction is perpendicular to the transverse direction.

It should be noted that the terms above, upper, below, lower and bottom, as well as any other similar terms are used in reference to the position of the instep enclosure arrangement 10 as depicted in the drawings and the arrangement may be positioned and used in other orientations.

As depicted in FIGS. 2 to 3, the instep enclosure arrangement 10 here comprises an instep portion having two insteps 4. The insteps 4 are arranged at different heights in the vertical direction Z for making it more convenient for the driver to enter the inside of the cabin 2 and the driver seat. However, in other types of truck cabins, it may be sufficient with one instep, i.e. an instep portion comprising one instep, or with additional instep portions and/or insteps, such as three and four insteps.

The instep enclosure arrangement 10 also comprises the cover in the form of a retractable flap 5. The flap is adapted to enclose the access to the instep portion(s) 4 when the tractable flap is set in a closed orientation, as illustrated in FIG. 1. When the retractable flap 5 is in the closed orientation, the retractable flap 5 is arranged so as to close the access of the instep portion 4. In the closed orientation, the retractable flap 5 is generally also arranged in a flat orientation relative to the side of the cabin 2 and the cabin door 3, as illustrated in FIG. 1. In regard to the example embodiment as illustrated in FIG. 1, the closed orientation here also corresponds to a non-retracted state of the retractable flap 5.

Moreover, as illustrated in e.g. FIGS. 2 and 3, the instep enclosure arrangement 10 comprises a displaceable mechanical linkage assembly 20 for operatively connecting the retractable flap 5 with the door 3 of the truck 1. By means of the displaceable mechanical linkage assembly 20 connecting the retractable flap to the door 3, the retractable flap 5 is configured to move from the closed orientation (FIG. 1) towards a retracted state (FIG. 3) in response to a movement of the door 3, as also indicated by the arrows in the Figures. When the retractable flap is in the partially retracted state or fully retracted state, it becomes possible by the driver to access the instep portion, and subsequently entering into the cabin 2 of the truck 1.

Optionally, the configuration of the displaceable mechanical linkage assembly 20 is designed such that the retractable flap 5 is orientated in a fully retracted state, as illustrated in FIG. 3, when the door 3 is fully opened. Hence, the retractable movement of the retractable flap 5 linearly correlates to an opening degree of the door 3. In other words, the retractable flap 5 is fully moved into the retracted state when the door 3 is fully opened.

The cooperation between the retractable flap 5 and the door 3 can be provided in several different ways by means of the displaceable mechanical linkage assembly 20. Generally, the displaceable mechanical linkage assembly 20 is configured to pull the retractable flap 5 towards its retracted state when the door opens, while it is configured to push the retractable flap 5 into its closed orientation when the door 3 closes. The FIGS. 2 and 3 illustrate one example of arranging the mechanical linkage assembly 20 in the truck 1.

As shown in e.g. FIG. 2, the mechanical linkage assembly 20 is arranged to extend between the retractable flap 5 and the door 3. In this example embodiment, the mechanical linkage assembly 20 is arranged to the door 3 via a conventional door check link mechanism 22. The door check link mechanism 22 may either be an integral part of the mechanical linkage assembly 20 or a separate part of the instep door arrangement adapted to cooperate with other parts of the mechanical linkage assembly 20.

In other words, the door check link mechanism 22 generally corresponds to a movable door-cabin connecting part for connecting the door with the truck cabin. The door check link mechanism 22 is arranged to effect a movement of the retractable flap 5 upon a rotational movement of the door 3. In the example illustrated in FIGS. 1 to 3, the door check link mechanism 22 is arranged to effect movement of the retractable flap 5 upon a rotational movement of the door via a wire 23, extending between the door check link mechanism 22 and the retractable flap 5.

Typically, although not strictly required, the door check link mechanism 22 is a door rotational locking device configured to stop the door at a number of positions. Accordingly, the retracted flap 5 is here in its retracted state when the door 3 is in its fully open position, as illustrated in FIG. 3.

It should be noted that the door check link mechanism 22 may typically include additional features and components as is known in the art. The door check link mechanism is generally used in cooperation with hinges to allow the door to be retained at a predetermined position along a path of a door opening movement permitted by the hinge.

One schematic example of a door check link mechanism is illustrated in FIGS. 2 to 3. A typical check link mechanism generally includes a door side mounting portion 32 having a check assembly (not shown) that slidably engages an arm 24, and a vehicle mounting member 26 containing e.g. a release lever (not shown) that selectively attaches to the distal end of the arm 24. This type of check assembly can further include a pair of cam followers that are biased together to slide along a channel formed on upper and lower surfaces of the arm. The check assembly may also be configured to limit the opening of the door to an intermediate position. When further opening of the door is desired, the release lever can be operated to detach the distal end of the arm from the vehicle mounting member 26. When the arm is detached, the hinge allows the door to rotate to the fully open position.

In the example embodiment illustrated in FIGS. 1 to 3, the wire 23 of the mechanical linkage assembly 20 is connected to the arm 24 of the door check link mechanism 22. Hence, the mechanical linkage assembly 20 comprises the wire 23 and the door check link mechanism 22. As illustrated in e.g. FIG. 2, a part of the door check link mechanism 22 is arranged on an inner surface 30 of the door 3, while the wire 23 is attached to the retractable flap 5. The wire 23 can be arranged in several different ways through the vehicle and subsequently to the retractable flap 5. By way of example, the wire 23 is directed through an inside part of the insteps, and/or an inside section of instep enclosure arrangement, as illustrated in e.g. FIG. 2. Further, the wire 23 is here arranged through an inner vertical side wall 28 of the instep enclosure arrangement 10. The inner vertical side wall 28 is orientated generally inside the instep portion 4, as seen in the transverse direction Y. As illustrated in the e.g. FIG. 2, the wire 23 is also arranged to an inner side 7 of the retractable flap 5. That is, the wire 23 is arranged on the inner side 7 facing the inside of the arrangement 10, as seen in the transverse direction T. The wire 23 is attached to the retractable flap 5 in a suitable manner, e.g. by welded joint 9.

It should be readily appreciated that the attachment of the wire 23 to the door 3 via the door check link mechanism 22 is only one option of several different configurations. In other examples (although not shown), the displaceable mechanical linkage assembly comprises a wire directly arranged to connect to the inner surface 30 of the door 3.

The arrangement of the retractable flap 5 on the truck 1 can be provided in several different ways. In the example embodiment illustrated in FIGS. 1 to 3, the retractable flap 5 is a foldable arrangement comprising two flap sections. However, the retractable flap may also be provided by one flap section, that may either be slightly inclined or shaped in a curved manner.

Typically, the retractable flap 5 is rotationally arranged to another part of the instep enclosure arrangement. By way of example, as illustrated in e.g. FIG. 2, the retractable flap 5 is arranged about a pivot axis $L_A$. The pivot axis here corresponds to a longitudinal center axis $L_A$, extending along the longitudinal direction X of the truck cabin 2.

To this end, the retractable flap 5 is here arranged on a lower side of a first instep, but above a second instep, as seen in the vertical direction Z, and as illustrated in FIG. 3. The retractable flap 5 may also be arranged at other locations relative to the insteps and the instep portion.

The arrangement of the retractable flap 5 about the longitudinal center axis $L_A$ allows the retractable flap 5 to pivot about its pivot axis between the closed position, corresponding to the closed orientation in FIG. 1, and a position allowing access to the instep portions, also corresponding to the retracted state of the retractable step 5, as illustrated in FIG. 3.

Further, the retractable flap 5 here is configured to return to the closed orientation relative to the instep portion 4 when the door 3 is closed relative to the truck cabin 2, as illustrated in FIG. 1. By way of example, the retractable flap 5 is a spring-biased retractable flap so as to permit the retractable flap to return back to its closed orientation when the door 3 is closed. The retractable flap 5 in FIGS. 1 to 3 is spring-biased about the longitudinal center axis $L_A$ by means of a spring 8. The spring-biased arrangement of the retractable flap can be provided in several different ways, as is commonly known in the art. It may also be possible to provide a pre-tensioned retractable flap by means of other parts than a spring.

Optionally, the retractable flap 5 here comprises a locking part 14 for securely fixating the retractable flap 5 relative to the lower instep portion 4 when the retractable flap 5 is in the closed orientation. In FIG. 2, the locking part is provided in the form of a magnet. However, other types of locking parts are also conceivable depending on type of arrangement.

To sum up, the activation of the retractable flap 5 is by means of a movement of the door 3 of the truck 1, i.e. the force from opening the door is transferred through the mechanical linkage assembly 20, such as the cable wire 23, to retract the retractable flap 5. Accordingly, whenever the door 3 is opened to its fully open position, the retractable flap 5 is retracted inside an interior space defined by the arrangement of the instep portion, making way for the insteps/footsteps. Subsequently, when the door 3 is closed, when the instep is not used by the driver, the retractable flap is in the state of covering the opening/hole. As such, the retractable flap is arranged in a closed state relative to the insteps and the space defined between the insteps, thereby providing a smoother and more aerodynamic exterior surface of the cabin. Hence, the arrangement 10 contributes to improving the aerodynamic properties of the truck cabin. Meanwhile when the door opens, usually in situations when the driver uses the instep by stepping on the step plate, the retractable flap is in the state of uncover the opening/hole by pivoting into a retracted state inside the hole by being folded in align with the move of the door, as also illustrated by sequence presented by FIGS. 2 and 3.

To this end, the instep enclosure arrangement provides for an improved functionality between the instep portion, a cover for the instep portion in the form of the retractable flap and the door of the truck cabin. That is, the instep enclosure arrangement is configured to co-operate with the door and configured such that, when the retractable flap is in the closed orientation (non-retracted state), access of the instep portion is closed, while, when the retractable flap is in a retracted state, access of the instep portion is possible. In other words, the retractable flap is configured to co-operate with the door of the truck cabin such that the retractable flap is moved in the retracted state when the door is opened, while the retractable flap is moved in the non-retracted state when the door is closed, whereby access to the instep portion is closed.

It is to be noted that any numerical designations, such as "first" or "second" are illustrative only and are not intended to limit the scope of the invention in any way.

It is to be understood that the present disclosure is not limited to the embodiments described above and illustrated in the drawings; rather, the skilled person will recognize that many changes and modifications may be made within the scope of the appended claims.

The invention claimed is:

1. An instep enclosure arrangement for a cabin of a vehicle, comprising:

at least one instep portion, a retractable cover comprising an upper section and a lower section foldable relative to the upper section, the retractable cover configured to move between a closed orientation enclosing access to the instep portion and a retracted orientation providing access to the instep portion; and a displaceable mechanical linkage assembly comprising a wire coupled to an interior of the lower section of the retractable cover and configured to couple to a door of the vehicle, wherein the wire of the displaceable mechanical linkage assembly is configured to, in response to opening the door, pull the retractable cover from the closed orientation to the retracted orientation so as to permit access to the instep portion.

2. The instep enclosure arrangement of claim 1, wherein the retractable cover is configured to return to the closed orientation relative to the instep portion when the door is closed relative to the cabin.

3. The instep enclosure arrangement of claim 2, wherein the retractable cover is a spring-biased retractable cover so as to permit the retractable cover to return back to its closed orientation when the door is closed.

4. The instep enclosure arrangement of claim 1, wherein the displaceable mechanical linkage assembly is arranged to extend between the retractable cover and the door.

5. The instep enclosure arrangement of claim 4, wherein the displaceable mechanical linkage assembly comprises a movable door-cabin connecting part for connecting the door with the cabin, the movable door-cabin connecting part being arranged to effect movement of the retractable cover upon a rotational movement of the door.

6. The instep enclosure arrangement of claim 5, wherein the movable door-cabin connecting part is arranged to effect movement of the retractable cover upon a rotational movement of the door via the wire extending between the movable door-cabin connecting part and the retractable cover.

7. The instep enclosure arrangement of claim 5, wherein the moveable door-cabin connecting part is a door rotational locking device configured to stop the door at a number of positions.

8. The instep enclosure arrangement of claim 1, wherein the displaceable mechanical linkage assembly comprises the wire being directly connected to an inner surface of the door.

9. The instep enclosure arrangement of claim 1, wherein the retractable cover comprises a locking part for securely fixating the retractable cover relative to the instep portion when the retractable cover is in the closed orientation.

10. The instep enclosure arrangement of claim 1, wherein the retractable cover is rotationally arranged to another part of the instep enclosure arrangement.

11. A cabin for a vehicle, comprising the instep enclosure arrangement of claim 1.

12. A vehicle comprising the cabin of claim 11.

13. A vehicle comprising the instep enclosure arrangement of claim 1.

* * * * *